(12) United States Patent
Rattunde

(10) Patent No.: US 8,424,428 B2
(45) Date of Patent: Apr. 23, 2013

(54) TOOL HEAD FOR A PIPE CUTTING MACHINE

(75) Inventor: Ulrich Rattunde, Bentwisch (DE)

(73) Assignee: Rattunde & Co GmbH, Ludwigslust (DE)

( * ) Notice: Subject to any disclaimer, the term of this patent is extended or adjusted under 35 U.S.C. 154(b) by 0 days.

(21) Appl. No.: 13/374,067

(22) Filed: Dec. 9, 2011

(65) Prior Publication Data

US 2012/0227553 A1 Sep. 13, 2012

Related U.S. Application Data

(63) Continuation of application No. 12/312,688, filed as application No. PCT/DE2007/002004 on Nov. 7, 2007, now abandoned.

(30) Foreign Application Priority Data

Nov. 22, 2006 (DE) .......................... 10 2006 055 417

(51) Int. Cl.
*B23B 29/00* (2006.01)
*B23B 29/34* (2006.01)

(52) U.S. Cl.
USPC .............................................. 82/1.11; 82/1.2

(58) Field of Classification Search .................. 82/1.11, 82/157, 158, 160, 161, 1.2; 279/2.11, 114, 279/66, 19, 120
See application file for complete search history.

(56) References Cited

U.S. PATENT DOCUMENTS

| 2,463,292 | A | 3/1949 | McCallion |
| 2,852,969 | A | 9/1958 | Piha |
| 4,685,362 | A | 8/1987 | Mayer |
| 6,655,883 | B2 * | 12/2003 | Maar ............................. 408/158 |
| 7,052,217 | B2 * | 5/2006 | Johne ............................ 408/156 |
| 7,260,877 | B2 * | 8/2007 | Broadley ...................... 29/27 R |
| 7,614,326 | B2 * | 11/2009 | Peltonen et al. ............... 82/1.11 |
| 8,156,848 | B2 * | 4/2012 | Fronius et al. .................. 82/1.2 |
| 2008/0018062 | A1 | 1/2008 | Wachtler |

FOREIGN PATENT DOCUMENTS

DE 199 51 658 5/2001

\* cited by examiner

*Primary Examiner* — Will Fridie, Jr.

(57) ABSTRACT

The invention concerns a tool head with a housing (11), in which at least one thrusting wedge (31, 32, 33) is provided, able to move back and forth in the longitudinal direction (L) in a first toothed guide, which is coordinated with a support (21, 22, 23) in the housing (11), able to move in a second toothed guide in a transverse direction (R1, R2, R3) transversely to the longitudinal direction (L), and the thrusting wedge (31, 32, 33) and the coordinated support (21, 22, 23) are in sliding contact with each other via a slanted contact surface (51, 52, 53) and a movement of the thrusting wedge (31, 32, 33) in the longitudinal direction (L) brings about a transverse movement of the coordinated support (21, 22, 23) via the slanted contact surface (51, 52, 53) and a cutting tool (161, 162, 163) can be fastened on the support (21, 22, 23) and the support (21, 22, 23) has a support arm (101, 102, 103) extending in the transverse direction (R1, R2, R3).

14 Claims, 4 Drawing Sheets

TOOL HEAD FOR A PIPE CUTTING MACHINE

CROSS-REFERENCE TO RELATED APPLICATIONS

This application is a continuation of U.S. patent application Ser. No. 12/312,688 filed May 21, 2009 now abandoned, which is a National Phase Application of International Application No. PCT/DE2007/002004, having an International filing date of Nov. 7, 2007, and claiming priority of a corresponding German application filed Nov. 22, 2006.

STATEMENT REGARDING FEDERALLY SPONSORED RESEARCH OR DEVELOPMENT

Not Applicable.

PARTIES TO A JOINT RESEARCH AGREEMENT

Not Applicable.

BACKGROUND OF THE INVENTION

1. Field of the Invention

The invention concerns a tool head, a machine for machining of the ends of a rodlike profile material, and a method for machining the ends of a rodlike profile material.

2. Background Art

Pipe cutting machines and tool heads designed for them are known in the prior art. Traditional pipe cutting machines have a tool head with one or more blades and a chuck device for a pipe being machined, which is arranged fixed in position directly in front of the rotating tool in the lengthwise direction. The tool head is placed in rotation and moved in the lengthwise direction against the end face of the pipe. By appropriate arrangement of the blades, one can make interior and exterior bevels on the wall of the pipe, as well as machine the end face of the pipe.

The drawback to the described pipe cutting machines is the fact that the cutting tools cannot be moved in controlled manner in the radial direction. Thus, in particular, it is not possible to make grooves, recesses or the like in the interior or exterior wall of the pipe behind the end face.

BACKGROUND OF THE INVENTION

The problem of the present invention is to provide an aforementioned tool head, an aforementioned machine and a method for machining ends of a rodlike profile material.

As regards the tool head, the stated problem is solved with a tool head having the features of claim 1.

By relief turning is meant here in particular grooves, recesses, contours, etc., running radially about the rodlike profile material in the inner and/or outer wall. These recesses, grooves, etc., can have changes along the radial circumference, thus, the grooves can have a varying width or depth along the circumference or a profile differing in a cross section along the lengthwise direction. Relief-turned features can be made in any place at a distance from the end face of the profile material, for which materials is ablated from the respective material wall on the inside or outside, but without removing profile material between the end face and the ablated region. In particular, radially encircling grooves can be made in the inner and/or outer wall of the material at the particular distance from the end face of the material.

For this, the tool head of the invention has a housing, in which at least one thrusting wedge is provided, which is arranged so as to move back and forth in the longitudinal direction in a first toothed guide. The first toothed guide has two tooth profiles corresponding to each other and sliding back and forth in each other in the longitudinal direction. A first tooth profile is placed on an outer wall of the thrusting wedge, while a corresponding first tooth profile is provided on an inner wall of the respective thrusting wedge guide in a housing. The toothed guide creates an enlarged contact surface between thrusting wedge and housing; thus, a substantially improved guide as compared to a smooth t-guide or a dovetail guide, with substantially enhanced quality and better accuracy of repetition and precision.

Each of the thrusting wedges is coordinated with a support in the housing, able to move in a second toothed guide in a direction arranged transversely to the longitudinal direction. The same applies accordingly to the second toothed guide as was said about the first toothed guide of the thrusting wedge. The second tooth profile placed on the outer wall of the support interacts with a corresponding second tooth profile arranged on the inner wall of a thrusting wedge guide that is countersunk in the housing. Thanks to the enlarged contact surface, here as well one has a toothed guide of high quality. The thrusting wedge and the coordinated support are in sliding contact with each other via a slanted contact surface and a movement of the thrusting wedge in the longitudinal direction is transformed via the slanted contact surface into a transverse movement of the coordinated support. The slanted contact surface is preferably configured smooth over its entire extent and with constant gradient.

To further enhance the guiding accuracy and quality of the second toothed guide, the support has a support arm extending in the transverse direction. Preferably, the transverse direction runs perpendicularly to the longitudinal direction and in the radial direction of the cutting tool.

A cutting tool can be fastened on the support, preferably to a fastening plate. Advantageously, the cutting tool fastened to the support can thus move in the radial direction.

During operation, the tool head is in rapid rotational movement about the lengthwise axis. The tool head of the invention makes it possible to radially guide and adjust the cutting tools even during the rotational motion. For this, the tool head is mounted on a rotary transmission leadthrough, having three push rods arranged alongside each other in the longitudinal direction. The ends of the push rods can touch the thrusting wedges and enter into an active engagement with them. Preferably, a thrust force is transmitted by the push rods to the coordinated thrusting wedge.

Preferably, the at least one thrusting wedge and the at least one support are each coordinated with a return spring. The thrusting wedge can be pressed into the tool head at one end face of the tool head by thrust force on a thrusting wedge arm sticking out from the tool head in the lengthwise direction, while the same thrusting wedge is restored automatically by the return spring in the lengthwise direction.

Due to the slanted contact surface, the lengthwise movement of the thrusting wedge is diverted into a transverse movement of the support. By the pressing of the thrusting wedge, the support is moved radially inward, while when the thrusting wedge is relaxed it is moved radially outward due to its coordinated return spring. By controlled thrust force on the thrusting wedge arm, a correspondingly controlled transverse movement of the respective cutting tool is possible.

The cutting tool makes it possible, for example, to make radial relief turning features on an outer wall of a rodlike profile material that is circular in cross section. For this, the cutting tools are first moved radially outward, the tool head is placed in rotating motion, and the moved in the lengthwise direction toward the end face, far enough so that the cutting tools come up behind the end of the rodlike profile material. Only now is the cutting head moved inward under control by deliberate pressing force on the at least one thrusting wedge arm, thereby producing a relief turning in the outer wall at a distance from the end face of the profile material.

In an especially preferred embodiment of the invention, a plurality of supports is provided in the shape of a star in a cross section perpendicular to the lengthwise direction and each support has a support arm coordinated with it, running transversely. The support arms are arranged in crossing manner, looking at them in the lengthwise direction. This embodiment of the invention makes it possible to accommodate a plurality, preferably precisely three supports in the tool head in space-saving fashion, but still with high precision of guidance. Due to the crossing arrangement of the support arms, which are preferably also provided along their outer surface with a corresponding second tooth profile along their transverse direction of movement, the support still preserves a high quality of guidance and precision of replication.

Favorably, the housing is fashioned essentially in circular shape in a cross section perpendicular to the lengthwise direction, and the at least one thrusting wedge has a first outer tooth profile on opposite, radially-extending outer walls on the thrusting wedge, interacting as the first tooth guide with a first inner tooth profile on an inner wall of the thrusting wedge guide.

Advantageously, the radial outer walls of a thrusting wedge which is rectangular in cross section perpendicular to the lengthwise direction are provided precisely with a first outer tooth profile extending in the lengthwise direction. The corresponding first inner tooth profile is placed on the inner wall of the thrusting wedge guide in the housing.

All tooth profiles are produced in especially precise manner by wire-EDM. Wire-EDM makes it necessary for the tooth profiles to extend over the entire dimension of the corresponding guides of the structural part.

In another preferred embodiment of the invention, the at least one support has a second outer tooth profile on opposite, radially-extending walls, interacting with a second inner tooth profile on an inner wall of the support guide for the second toothed guide. The second toothed guide is preferably led radially through the housing, perpendicular to the lengthwise direction. The other second tooth profile favorably extends over the entire radial dimension of the support arm. Due to the additional second toothed guide of the support, an especially high accuracy and quality of guidance is achieved.

Preferably, the at least one thrusting wedge has a constant design height. By design height is meant here the dimension of the thrusting wedge perpendicular to the lengthwise direction and perpendicular to the radius of the tool head. For cost savings, the thrusting wedges are identical in construction.

In another preferred embodiment of the invention, the part of the at least one support provided in the housing also has a constant design height along its entire dimension.

Advantageously, the thrusting wedge projects into the support guide temporarily during the operation. For this, the design height of the thrusting wedge is less than the design height of the support by the tooth depth of the second tooth profile.

Support and thrusting wedge in one economical embodiment of the invention are automatically reset by appropriately dimensioned return springs.

Regarding the machine for machining of the ends of a rodlike profile material, the stated problem is solved by a machine with a tool head as described above. A machine which enables a corresponding control of the tool head has, for example, a rotary transmission leadthrough.

Regarding the method, the problem is solved by a method for machining the ends of a rodlike profile material, in that a radial relief turning is produced in one wall of the profile material. Such a method can be implemented by a tool head as described above and a machine as described above.

Preferably, the at least one support for the machining of an outer wall of the profile material is at first moved radially outward or that for the machining of an inner wall of the profile material is at first moved radially inward. In this way, it is possible to lead up the cutting tool in the lengthwise direction of the profile material behind one end surface of the profile material without contacting it, then to rotate the cutting tool relative to the profile material about a lengthwise axis oriented in the longitudinal direction and to move the cutting tool radially toward the wall during the rotation until the wall is contacted by the cutting tool, and to make a relief turning in the wall by the contacting.

BRIEF DESCRIPTION OF THE SEVERAL VIEWS OF THE DRAWING

The invention will be described by means of a sample embodiment in seven figures. These show.

DETAILED DESCRIPTION OF THE INVENTION

Figure 1:
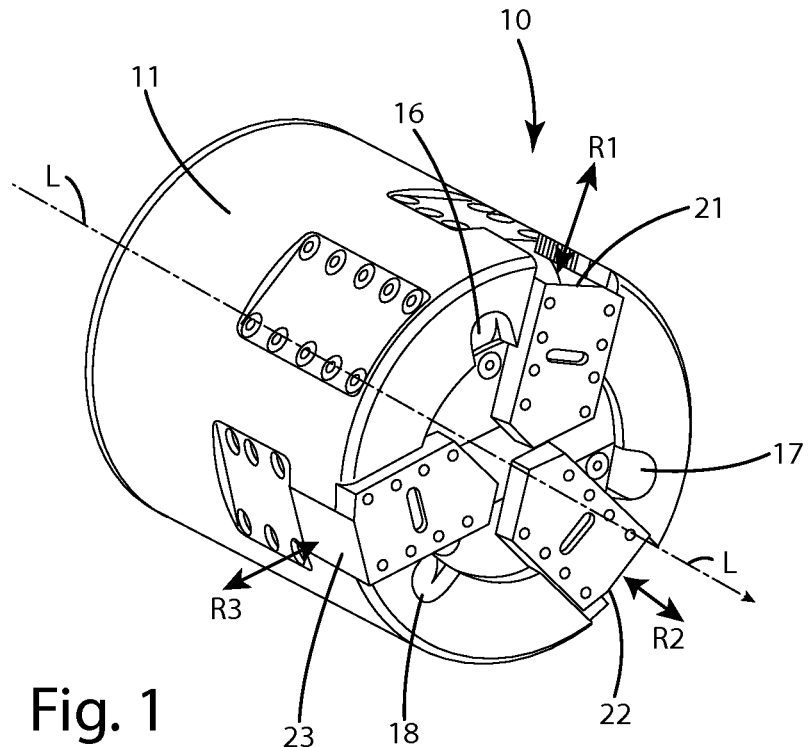
FIG. 1 is a perspective view of the tool head of the invention.

The tool head 10 shown in FIG. 1 has an essentially circular housing 11 in the cross section perpendicular to the longitudinal direction L. The tool head 10 is mounted so that it can turn in operation about an axis of rotation led centrally through the tool head 10 and oriented in the longitudinal direction L in a machine for cutting to length pieces of a rodlike profile material, especially a pipe cutting machine, and it is driven about this axis at up to 1000 revolutions per minute. The tool head 10 has three radially movable supports 21, 22, 23. The three radial directions R1, R2, R3 are arranged at an angle of 120 degrees from each other and perpendicular to the lengthwise direction L. In operation, a cutting tool (not shown) is mounted at the outside of each support 21, 22, 23, being fixed in position relative to it. The adjusting length of each support 21, 22, 23 is around 10 mm along the corresponding radial direction R1, R2, R3. The tool head is NC-controlled in operation by a rotary transmission leadthrough of the pipe cutting machine.

The tool head 10 shown in FIG. 1 is intended to work the ends of metallic profiles, especially pipes or solid circular profiles, using the cutting tools (not shown). The cutting tools are interchangeably mounted, and they can be of different kinds. The tool head 10 has three boreholes 16, 17, 18 led through the tool head 10 in the lengthwise direction L for bolts to fasten a rotary transmission leadthrough, driving the tool head.

Figure 2:
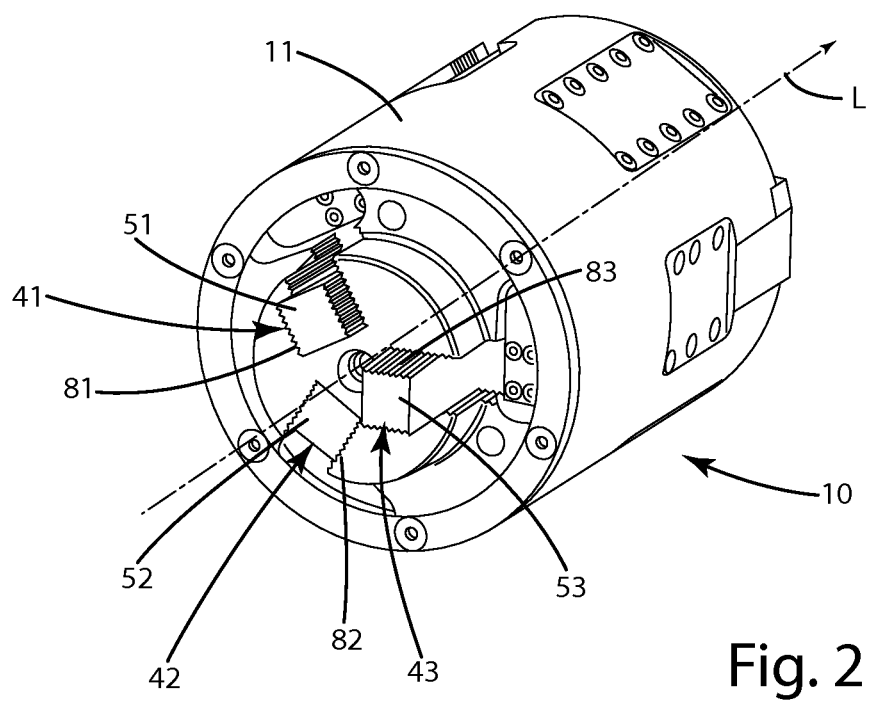
FIG. 2 is a second perspective view of the tool head of the invention.

FIG. 2 shows the tool head 10 per FIG. 1 in a rear view. In operation, the pipe being machined is arranged in the lengthwise direction L concentric to the tool head 10, so that the three cutting tools (not shown) can machine the pipe end. For this, the tool head 10 is shoved in the lengthwise direction L toward the pipe end chucked in front of the tool head 10 and the three cutting tools perform predetermined machining operations on the pipe end by rotational movement.

The rear view shown in FIG. 2 shows three thrusting wedge arms 41, 42, 43 of three thrusting wedges 31, 32, 33 arranged so that they can move back and forth in the lengthwise direction L in the housing 11. The tool head 10 is controlled by a rotary transmission leadthrough (not shown), having three push rods, which on the one hand provides a sufficient rotation movement about the lengthwise axis L, which is transmitted to the tool head 10 being fixed in position relative to the rotary transmission leadthrough, and which additional provides three individually controllable push rods, which by applying pressure move and control three thrusting wedges 31, 32, 33, each of which is coordinated with one push rod. The rotary transmission leadthrough (not shown) exerts a controlled pressure individually on each of the three thrusting wedge arms 41, 42, 43 in operation, each time by means of a flat contact surface 51, 52, 53. Due to the pressure, the thrusting wedge 31, 32, 33 is pushed in the lengthwise direction L toward the pipe being machined. When the pressure is no longer applied, the respective thrusting wedge 31, 32, 33 is automatically restored due to a return spring 61, 62, 63 provided in the housing 11.

Figure 3:
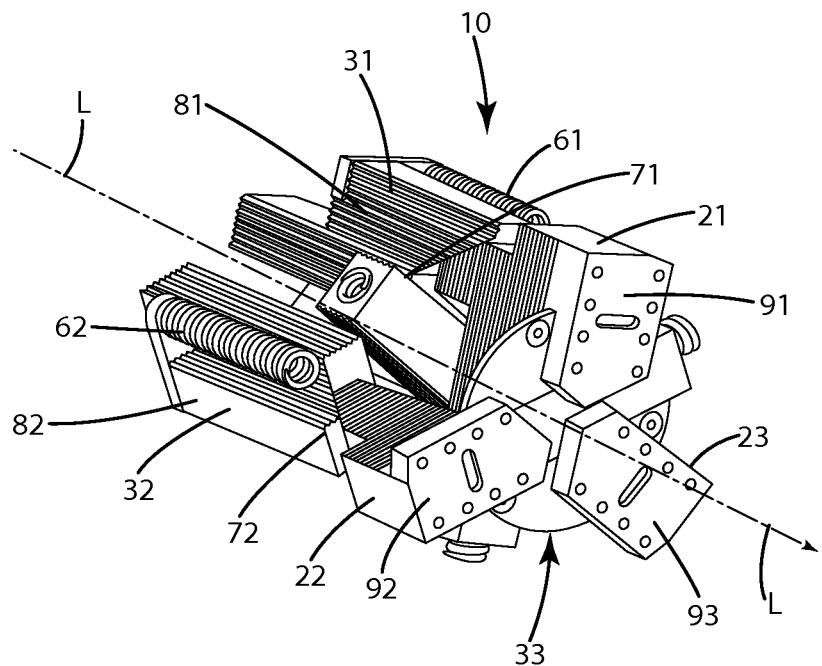
FIG. 3 is a view per FIG. 1 with housing removed.

FIG. 3 shows the three thrusting wedges 31, 32, 33 and three supports 21, 22, 23 in their relative arrangement to each other. The three thrusting wedges 31, 32, 33 are identical in construction and are arranged at an angle of 120 degrees relative to each other about the lengthwise axis L of the tool head 10. Each thrusting wedge 31, 32, 33 has the coordinated thrusting wedge arm 41, 42, 43 at the end facing the rotary transmission leadthrough and a beveled surface 71, 72, 73 at the end facing the support 21, 22, 23. The beveled surface 71 has a uniform slope with respect to the lengthwise axis L. In the radially outward region, each of the thrusting wedges 31, 32, 33 has a recess for its coordinated return spring 61, 62, 63. One end of the return spring 61, 62, 63 is connected firm in position to the thrusting wedge 31, 32, 33, while the other end of the return spring 61, 62, 63 is connected firm in position to the housing 11.

Each of the thrusting wedges 31, 32, 33 has two outer walls extending opposite each other in the radial direction, each of which is provided entirely with a tooth profile 81, 82, 83 running in the lengthwise direction. The tooth profile 81, 82, 83 is made in the outer walls by means of a wire-EDM process. The design height of each of the thrusting wedges 31, 32, 33 perpendicular to the lengthwise axis L and perpendicular to the radial direction is constant over the entire longitudinal and radial dimension of the thrusting wedge 31, 32, 33. The slanted contact surface 71, 72, 73 of the thrusting wedge 31, 32, 33 has a constant slope over its entire dimension. It is in constant and sliding contact with a corresponding slanted contact surface 71, 72, 73 of the support 21, 22, 23 coordinated with the thrusting wedge 31, 32, 33.

Figure 4:
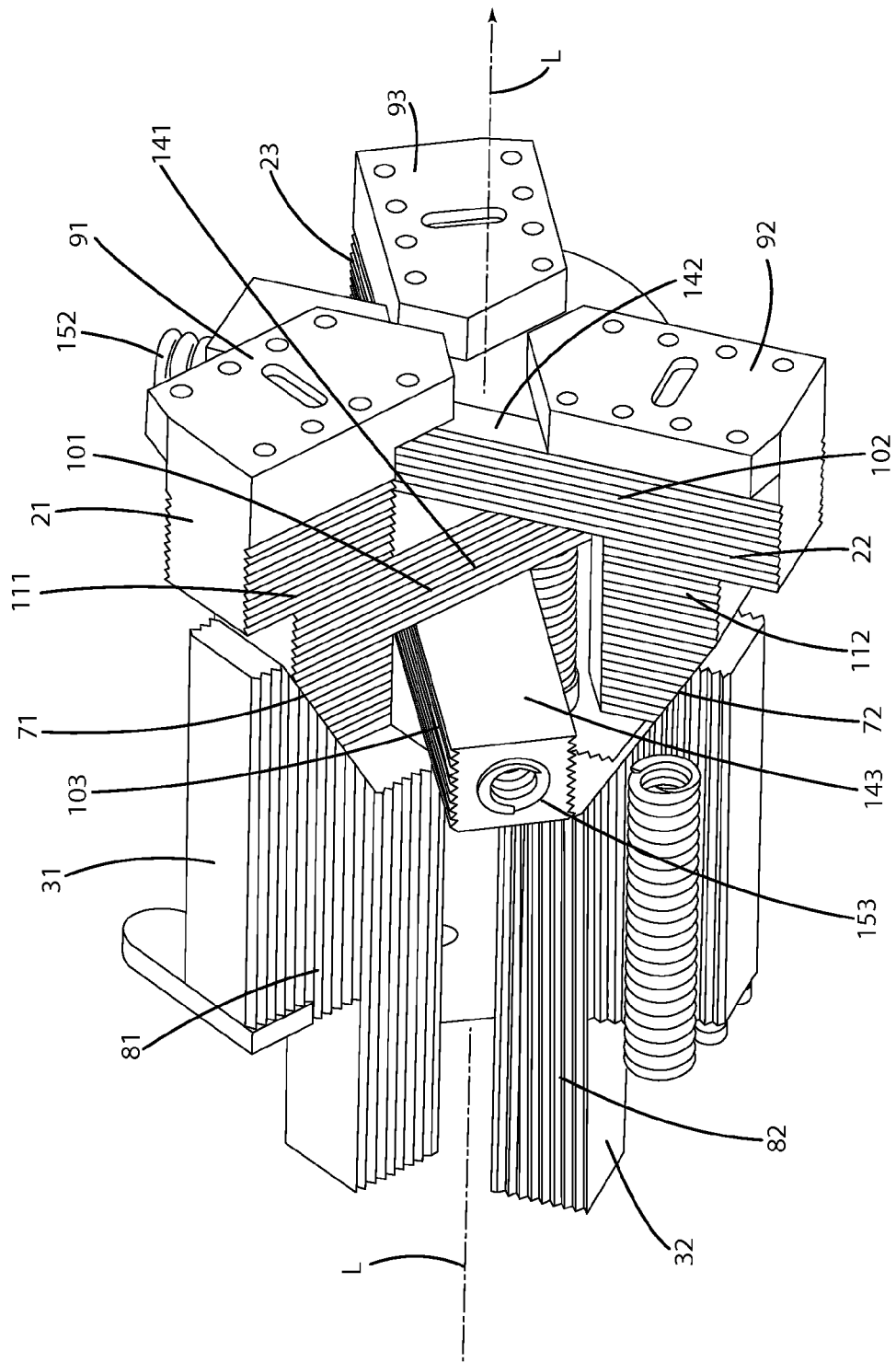
FIG. 4 is a view per FIG. 3 with holding plates.

Each support 21, 22, 23 has, per FIG. 4, a fastening plate 91, 92, 93 for a cutting tool. The cutting tools are not shown. The supports 21, 22, 23 are arranged precisely in the radial direction of the tool head 10, able to move back and forth in the tool head 10. The inwardly directed radial movement of the support 21, 22, 23 is caused by a pressing force exerted via the thrusting wedge 31, 32, 33 on the support 21, 22, 23, by pressing the thrusting wedge 31, 32, 33 coordinated with the support 21, 22, 23 into the interior of the housing 10. Thanks to the two slanted contact surfaces 71, 72, 73 between thrusting wedge 31, 32, 33 and coordinated support 21, 22, 23, a force on the thrusting wedge 31, 32, 33 is deflected in the radial direction. In the assembled state, the fastening plates 91, 92, 93 of the support 21, 22, 23 are provided outside the housing 11. Inside the housing 11, each support 21, 22, 23 has a support arm 101, 102, 103 extending in the radial direction. The three support arms 101, 102, 103 intersect each other inside the housing, looking along the lengthwise axis L. Each support 21, 22, 23 has two side support walls extending opposite each other in the radial direction, which stand perpendicular to the respective slanted contact surfaces 71, 72, 73 and extend along the respective support arm 101, 102, 103, and which are provided with a radially extending second tooth profile 111, 112, 113 basically along their entire dimension.

The design height of each support 21, 22, 23 in the housing 11, perpendicular to the lengthwise axis L and perpendicular to the radial direction, is basically constant over the entire dimension of the support 21, 22, 23.

The design height of the thrusting wedges 31, 32, 33 is equal overall in the lengthwise direction and radial direction. On each thrusting wedge 31, 32, 33, first tooth profiles 81, 82, 83 lie opposite each other. The design height of the thrusting wedges 31, 32, 33 is smaller than the design height of the support 21, 22, 23 by the tooth profile depth of the second tooth profiles 111, 112, 113.

The tooth profiles 81, 82, 83, 111, 112, 113 correspond to coordinated tooth profiles which are countersunk in the inside of the housing 11.

The housing 11 is made from a short solid-profile pipe. The three thrusting wedge guides provided to accommodate the thrusting wedges are configured rectangular in a cross section perpendicular to the lengthwise axis L, and they extend over the entire length of the tool head 10 and have on their radially extending inner walls a corresponding first tooth profile extending over the entire length dimension.

The corresponding first tooth profile is likewise made by wire-EDM.

The housing 11, furthermore, has three radial support guides for the three supports 21, 22, 23. The three support guides are led entirely through the housing 11 in the radial direction R1, R2, R3 and have two tooth profiles which can likewise be made by wire-EDM on their inner walls extending in the radial direction. The width of the support guide is somewhat larger than the width of the thrusting wedge guide, so that the thrusting wedge 31, 32, 33 able to move in the lengthwise direction during operation can penetrate a bit more into the guide of the support 21, 22, 23.

Figure 5:
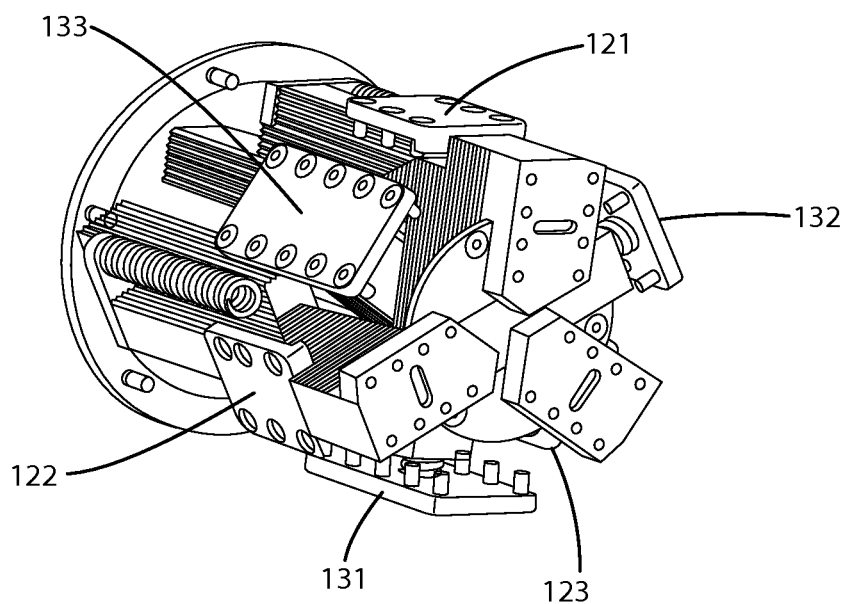
FIG. 5 is a schematic view of the tool head without housing.

The three support guides are covered on their cylindrical outer sides by two closure plates apiece 121, 122, 123, 131, 132, 133, as shown by FIG. 5. The length of each support arm 101, 102, 103 is such that each support 21, 22, 23 can move back and forth by around 10 mm in the support guide in the radial direction R1, R2, R3 before the end of the support arm 101, 102, 103 hits the bolted-on-closure plate 131, 132, 133. A return spring 151, 152, 153 is let into each support arm 101, 102, 103 in the radial direction, which automatically resets the support 21, 22, 23 radially outwardly.

The arrangement of the closure plates 121, 122, 123, 131, 132, 133 is shown in FIG. 5.

The thrusting wedges 31, 32, 33 are identical in construction, while the supports 21, 22, 23 are not identical in construction. The dimension of the supports in the lengthwise direction L is identical. The radial dimension of the supports is also identical. However, the arrangement of the support arms 101, 102, 103 relative to the support 21, 22, 23 is different. The support arms 101, 102, 103 are arranged on the respective support 21, 22, 23 with an offset in the lengthwise direction L, and this by the lengthwise dimension of a neighboring support arm 101, 102, 103, so that the support arms 101, 102, 103 are arranged intersecting in the housing 11 and their radial movements do not interfere with each other. The fastening plates 91, 92, 93 of the supports 21, 22, 23 form a common flat surface.

Figure 6:
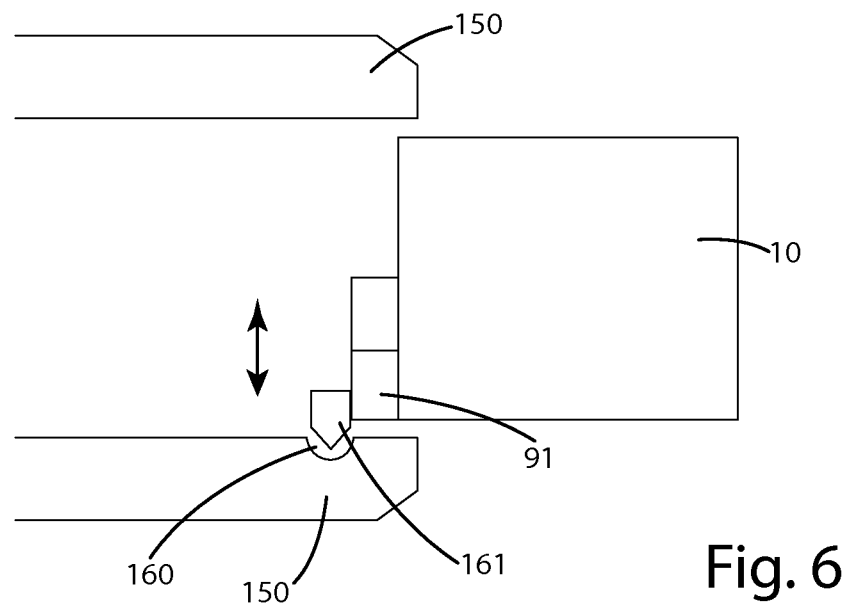
FIG. 6 is a tool head with blade.

As compared to the known prior art, the tool head 10 of the invention has the considerable advantage that the three tools 161, 162, 163 which can be mounted on the fastening plate 91, 92, 93 are radially adjustable during operation, i.e., the rotation of the tool head 10, as shown by FIG. 6. This radial movement can be controlled at any time during the operation. Due to the tool head 10 of the invention it is possible, on the one hand, to provide inner and outer bevels on the pipe end 150, as well as to machine the end face of the pipe end 150, but also pipe ends 150 of different diameter can be provided with the same length of bevel without a tool change. In particular, however, it is also possible to make radial relief turnings 160 in the inner and outer walls of the pipe ends 150, as well as make recesses in the inner and outer walls, especially those of a radial nature, which can have the most diverse of profiles. For this, the supports 21, 22, 23 are first moved inward, the tool head 10 is then pushed into the pipe end 150 and the supports 21, 22, 23 then travel radially outward until the cutting tools 161, 162, 163 touch the wall of the pipe. At this moment, the radial relief turning 160 is made in the wall of the pipe end 150.

Figure 7:
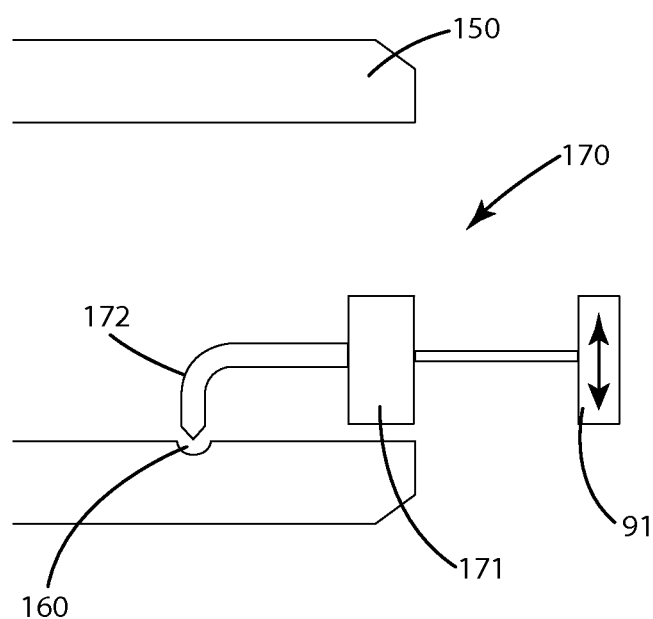
FIG. 7 is a tool head with necking tool according to the invention.

Usually pipe ends 150 have an eccentricity, i.e., the pipe wall changes slightly along the circumference. In order to make an inner bevel, and also to make a radial relief turning 160 of constant depth along the circumference of the pipe end 150, a necking tool 170 per FIG. 7 is provided. The bench chisel 170 has a roller 171, which can rotate about an axis in the lengthwise direction L that emerges in fixed position from one of the fastening plates 91, 92, 93 of the supports 21, 22, 23. A Bench chisel 172 is provided on the side of the roller 171 away from the support 21, 22, 23, whose tip projects radially beyond the roller 171. In order to make a radial relief turning 160 in the inner wall of a pipe, the tool head 10 is first introduced into the interior of the pipe end 150 with radially inward adjusted supports 21, 22, 23. The bench chisel 172 and the roller 171 do not make contact with the inner wall of the pipe in this process. Then the respective thrusting wedge 31, 32, 33 is retracted and the respective support 21, 22, 23 is moved radially outward by the force of the return spring 151, 152, 153. The bench chisel 172 touches the inner wall of the pipe and makes a radial relief turning 160 in the inner wall of the pipe. The depth of penetration of the bench chisel 172 is limited constant by the diameter of the roller 171 along the circumference of the pipe.

Furthermore, it is possible, with another tool that has a roller 171 and a blade arranged between roller 171 and support 21, 22, 23, to make in corresponding manner a bevel along the circumference of the pipe end 150 of equal length to the inner wall of the pipe.

What is claimed is:
1. Tool head with a housing (11), in which:
at least one thrusting wedge (31, 32, 33) is provided, able to move back and forth in the longitudinal direction (L) in a first toothed guide, which is coordinated with a support (21, 22, 23) in the housing (11), able to move in a second toothed guide in a transverse direction (R1, R2, R3) transversely to the longitudinal direction (L);
and the thrusting wedge (31, 32, 33) and the coordinated support (21, 22, 23) are in sliding contact with each other via a slanted contact surface (51, 52, 53) and a movement of the thrusting wedge (31, 32, 33) in the longitudinal direction (L) brings about a transverse movement of the coordinated support (21, 22, 23) via the slanted contact surface (51, 52, 53); and
a cutting tool (161, 162, 163) can be fastened on the support (21, 22, 23) and the support (21, 22, 23) has a support arm (101, 102, 103) extending in the transverse direction (R1, R2, R3).

2. Tool head per claim, 1 characterized in that the housing (11) is fashioned essentially in circular shape in one cross section and a plurality of supports (21, 22, 23) is provided in the shape of a star in one across section perpendicular to the lengthwise direction (L) and the support arms (101, 102, 103) are arranged in crossing manner, looking at them in the lengthwise direction (L).

3. Tool head per claim 2, characterized in that precisely three supports (21, 22, 23) are provided.

4. Tool head per claim 1, characterized in that the at least one thrusting wedge (31, 32, 33) has a first outer tooth profile (81, 82, 83) on opposite, radially extending outer walls, interacting with a first inner tooth profile on an inner wall of a thrusting wedge guide of the housing (11) of the first toothed guide.

5. Tool head per claim 1, characterized in that the at least one support (21, 22, 23) has a second outer tooth profile (111, 112, 113) on opposite, radially extending walls, interacting with a second inner tooth profile on an inner wall of a support guide of the housing (11).

6. Tool head per claim 1, characterized in that the thrusting wedges (31, 32, 33) are identical in construction.

7. Tool head according to at least one of the preceding claims, characterized in that the at least one thrusting wedge (31, 32, 33) has a constant design height.

8. Tool head per claim 1, characterized in that the part of the at least one support (21, 22, 23) provided in the housing (11) has a constant design height.

9. Tool head per claim 1, characterized in that the design height of the thrusting wedge (31, 32, 33) is less than the design height of the corresponding support (21, 22, 23) by the depth of the second tooth profile (111, 112, 113).

10. Tool head per claim 1, characterized in that the at least one thrusting wedge (31, 32, 33) and/or the at least one support (21, 22, 23) are each coordinated with a return spring (61, 62, 63, 151, 152, 153).

11. Tool head per claim 1, characterized in that a necking tool (170) is provided on one support (21, 22, 23) with a roller (171) which can turn about an axis arranged in a lengthwise direction and a bench chisel (172) is arranged on the roller (171) at the side away from the support (21, 22, 23), whose tip projects radially beyond the diameter of the roller (171).

12. Machine per claim 1 for machining of the ends of a rodlike profile material with a tool head (10).

13. Machine per claim 12, characterized in that the tool head (10) is mounted on a rotary transmission leadthrough.

14. Method for machining the ends of a rodlike profile material (150), in that a radial relief turning (160) is produced in one wall of the profile material (150) and characterized in that the at least one support (21, 22, 23) for the machining of an outer wall of profile material (150) is at first moved radially outward or that for the machining of an inner wall of the profile material (150) is at first moved radially inward, wherein a cutting tool (161, 162, 163) is led up in the lengthwise direction of the profile material (150) behind one end face of the profile material (150) without contacting it, the cutting tool (161, 162, 163) is rotated relative to the profile material (150) about a lengthwise axis oriented in the longitudinal direction and the cutting tool (161, 162, 163) is moved radially toward the wall during the rotation until the wall is contacted by the cutting tool (161, 162, 163), and a relief turning (160) is made in the wall by the contacting.

\* \* \* \* \*